United States Patent
Butler et al.

(10) Patent No.: US 7,731,098 B2
(45) Date of Patent: *Jun. 8, 2010

(54) THERMOSTAT RESPONSIVE TO INPUTS FROM EXTERNAL DEVICES

(75) Inventors: William P. Butler, St. Louis, MO (US); Steven L. Carey, St. Louis, MO (US); John R. Sartain, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 145 days.

This patent is subject to a terminal disclaimer.

(21) Appl. No.: 11/843,380

(22) Filed: Aug. 22, 2007

(65) Prior Publication Data

US 2007/0284452 A1 Dec. 13, 2007

Related U.S. Application Data

(63) Continuation of application No. 11/023,744, filed on Dec. 22, 2004, now Pat. No. 7,261,243.

(51) Int. Cl.
*F24F 7/00* (2006.01)
*G01K 13/00* (2006.01)
*F25B 29/00* (2006.01)
*G01M 1/38* (2006.01)

(52) U.S. Cl. .................. 236/49.3; 62/129; 165/241; 700/276

(58) Field of Classification Search .............. 62/126, 62/127, 129, 196; 236/49.3, 49.2, 15 C; 165/11.1, 241, 256; 700/278, 276
See application file for complete search history.

(56) References Cited

U.S. PATENT DOCUMENTS

| 4,147,203 | A | | 4/1979 | Rayfield .................. 165/241 |
| 4,307,775 | A | * | 12/1981 | Saunders et al. ........... 165/11.1 |
| 5,022,050 | A | * | 6/1991 | Tanaka ...................... 375/219 |
| 5,186,386 | A | | 2/1993 | Lynch ......................... 236/11 |
| 5,259,445 | A | | 11/1993 | Pratt et al. ................. 165/241 |
| 5,405,079 | A | | 4/1995 | Neeley et al. .............. 237/2 B |
| 6,729,390 | B1 | | 5/2004 | Toth et al. |
| 7,261,243 | B2 | * | 8/2007 | Butler et al. ............... 236/1 C |
| 2005/0234597 | A1 | * | 10/2005 | Harrod et al. .............. 700/276 |

\* cited by examiner

*Primary Examiner*—Chen-Wen Jiang
(74) *Attorney, Agent, or Firm*—Harness, Dickey & Pierce, P.L.C.

(57) ABSTRACT

A thermostat is provided that receives one or more inputs from at least one heating system of a climate control system, and initiates an appropriate action in response to the input. The thermostat can turn off a heat pump providing substandard heat and responsively turn on a fuel-fired auxiliary furnace. The thermostat may discontinue further operation of the auxiliary furnace upon receiving an operating error signal associated with the auxiliary furnace, and responsively turn on the heat pump to provide for continued heating. The thermostat may also discontinue operation of the fuel-fired furnace and turn on a circulating fan in response to an input signal indicating a furnace high-temperature or a carbon monoxide presence.

6 Claims, 1 Drawing Sheet

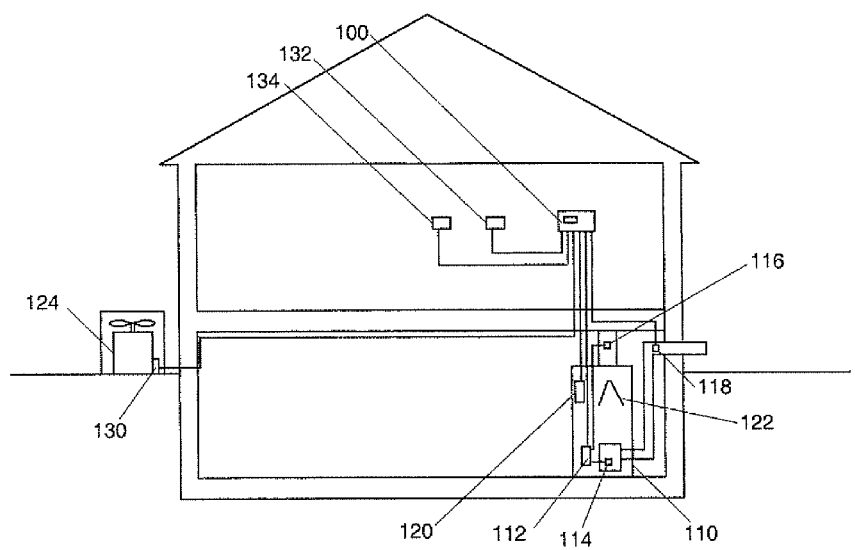

THERMOSTAT RESPONSIVE TO INPUTS FROM EXTERNAL DEVICES

CROSS-REFERENCE TO RELATED APPLICATIONS

This application is a continuation of U.S. patent application Ser. No. 11/023,744, entitled "Thermostat Responsive To Inputs From External Devices", filed Dec. 22, 2004, which is herein incorporated by reference in its entirety.

FIELD OF THE INVENTION

The present invention relates to thermostats, and in particular, to thermostats used for controlling climate control systems that include a fuel-fired heating system and or a heat pump system.

BACKGROUND OF THE INVENTION

Thermostats are typically used to control climate control systems to maintain the temperature of the space conditioned by the climate control system. A conventional thermostat compares the sensed temperature of the space with a set point temperature and activates the climate control system to heat or cool the space to the desired set point temperature. Some heating systems may comprise a fuel-fired heating system, while others comprise a heat pump and an auxiliary heat system. In the case of a single heating system, the conventional thermostat controls the system by turning on the fuel-fired furnace when there is a demand for heating, and turning on a higher second stage of heating (if present) when there is an increased demand for heating. In the case of a dual heat system, the conventional thermostat controls both systems by turning on the heat pump when there is a demand for heating, and turning on the auxiliary heat system when the heat pump is not adequately providing heating due to low outside temperatures. Such dual heat systems using an auxiliary or supplemental heat system may comprise a fuel-fired furnace. However, present conventional thermostats cannot identify problems with a heat pump or a fuel-fired furnace. In fact, an operating problem in either system may result in an inability of the climate control system to achieve the set point temperature, and the thermostat would only exacerbate the problem by continuing to request operation of the problematic system.

SUMMARY OF THE INVENTION

In accordance with one aspect of the present invention, a preferred embodiment of a digital thermostat is provided that receives one or more inputs from at least one heating system of a climate control system, and initiates an appropriate action in response to the input. The digital thermostat for controlling the operation of a climate control system having at least a heat pump system and an auxiliary heating system, comprising a display means for visually displaying operating error information to a user of the thermostat, a temperature sensor for sensing the outside ambient temperature, and a processor having an input means for receiving at least one communication signal from either the heat pump or auxiliary heating system indicating whether the heat pump or auxiliary heating system is not operating. The processor of the digital thermostat responds to the non-operating communication signal by initiating the deactivation of the non-operating system and the activation of the other operable system.

In another aspect of the present invention, some embodiments of a thermostat are provided that are capable of receiving a communication signal from an auxiliary heating system controller indicating the auxiliary heating system is not operating, and responsively initiating the activation of the heat pump system even if the outside ambient temperature is below the predetermined temperature value. Likewise, some embodiments of the present invention provide a thermostat capable of receiving a communication signal from a heat pump system indicating the heat pump system is not operating, and responsively initiating the activation of the auxiliary heating system. The thermostat is also capable of sensing a predetermined decrease in indoor temperature while one of either the heat pump system or the auxiliary heating system is operating, and responsively deactivating the operating system and activating the other system.

In yet another aspect of the present invention, the preferred embodiment of a digital thermostat comprising an LCD display and input means for receiving at least one input signal from at least one apparatus of a climate control system is capable of initiating an appropriate action in response to receiving an input signal to provide for improved control the climate control system. The thermostat may discontinue a call for second stage heating in response to receiving an input of a lock-out of second stage furnace operation. The thermostat may also discontinue operation of the fuel-fired furnace and turn on a circulating fan in response to receiving an input signal indicating a furnace high-temperature condition or a carbon monoxide presence. The thermostat is configured to display the information associated with the input signal on the display of the thermostat, and to ascertain whether a corrective action should be taken that appropriately addresses the input signal.

BRIEF DESCRIPTION OF THE DRAWINGS

The sole FIGURE is an illustration of a climate control system incorporating a thermostat according to the principles of the present invention.

DETAILED DESCRIPTION OF THE INVENTION

A thermostat for controlling a climate control system in which embodiments of the present invention can be implemented is indicated generally as 100 in the sole FIGURE. The climate control system includes at least one heating system, and may be single-stage or multi-stage fuel-fired heating system or a combined heat pump and auxiliary fuel-fired heating furnace 110. Typically, a heat pump comprises an outside unit 124 having a controller 130 and a compressor for compressing a refrigerant that transfers heat to an inside A-coil heat exchanger 122. A thermostat 100 controls the operation of the climate control system via connections to the one or more heating systems. The connections may comprise one or more wires between the thermostat 100 and the heat pump control 120 and fuel-fired furnace control 112, or the connections to the various systems could comprise a RS 485 or a RS-232 communication means, or RF communication or other wireless communication means. In one preferred embodiment, the thermostat 100 comprises an input connection means for RS 2485 communication to a processor of the thermostat 100, where the input connection may be connected to a plurality of external devices. The processor of the present invention is generally a microprocessor, and is preferably a 32Kb memory microprocessor S3C8249Xzz-OWR9 manufactured by Samsung which comprises an RS 285 input port pin.

The communication means in the preferred embodiment comprises a two-wire peer-to-peer network, such as a RS-485 peer-to-peer Local Area Network, but may alternatively comprise any other comparable network suitable such as a RS-232 network for use in a two-way communication arrangement. The RS-485 network is a two-wire, multi-drop network that allows multiple units to share the same two wires in sending and receiving information. The two-wire network connects to the processor of the thermostat and to each controller in the HVAC system, such as the heat pump controller or an auxiliary heating system controller. The thermostat and controllers are always enabled in the receiver mode, monitoring the network for information. Only one transmitter can communicate or occupy the network at a time, so each individual controller is configured to transmit at a fixed time period after the last transmission, where each controller has a fixed time period that is unique to that controller. Thus, after one controller completes its transmission, another controller will wait for the prescribed time period before transmitting its information. In this manner, collisions of data transmission from different controllers may be avoided. The transmissions may also include leader information at the beginning of each transmission, which identifies the controller that the transmission pertains to.

In response to an error input signal from the heat pump control 120 or furnace control 112 or other device external to the thermostat, the thermostat 100 can respond in one or more ways, including (1) displaying information associated with the input signal on a display of the thermostat 100, (2) discontinuing further second stage operation of the furnace, (3) discontinuing the call for heating and turning on the circulation blower fan, (4) discontinuing all further operation of the furnace, (5) discontinuing operation of the heat pump, if applicable, and initiating operation of the fuel-fired furnace, and (6) discontinuing operation of the fuel-fired furnace and initiating operation of the heat pump only, if applicable. In response to receiving an input signal from a fuel-fired furnace control 112 indicating a high temperature condition in the furnace heat exchanger, the processor of the thermostat 100 may discontinue heating operation of the fuel-fired furnace and turn on a circulation blower fan of the furnace until the high temperature condition ends. In response to receiving an input signal from a fuel-fired furnace control 112 of an error from a circulation air pressure switch, the thermostat 100 may indicate on the display of the thermostat a request to check or replace the air filter. In response to an input signal from a fuel-fired furnace control 112 indicating a lock-out of second stage heating, the processor of the thermostat 100 may discontinue further calls for second stage heating and only call for normal heating. In response to an input signal from a furnace control 112 indicating the furnace is locked-out due to repeated ignition failure or flame sense failure, the thermostat 100 may discontinue further calls for operation of the furnace and, if available, call for operation of a heat pump. Likewise, in response to an input signal from a heat pump control 120 indicating the heat pump compressor is inoperable due to locked-rotor or other failure, the thermostat 100 may discontinue further calls for operation of the heat pump and, if available, call for operation of an auxiliary fuel-fired furnace.

In the preferred embodiment of a thermostat incorporating the principles of the present invention, the thermostat is intended for use with one or more heating systems, and can receive one or more inputs from at least one heating system and initiate an appropriate action corresponding to the input. Where the thermostat is used in a dual heat system, the thermostat 100 can turn off a heat pump that is providing substandard heat as a result of near freezing outside temperatures and call for operation of an auxiliary or supplemental heating system. The auxiliary heating system may be of the fuel-fired furnace type having a furnace control 112. If after the thermostat 100 calls for operation of the auxiliary fuel-fired furnace the thermostat 100 receives an input signal indicating the fuel-fired furnace is locked-out or not operating, the thermostat may discontinue the call for operation of the auxiliary fuel-fired furnace and call for heat pump operation only to maintain a supply of heating for the space. Where the auxiliary fuel-fired furnace is not capable of providing an operating fault input to the thermostat, the thermostat 100 is configured to sense a decrease in temperature of the space during operation of the fuel-fired furnace. If after the thermostat 100 calls for operation of the auxiliary fuel-fired furnace the temperature of the space decreases more than a predetermined amount, the thermostat 100 may discontinue the call for operation of the auxiliary fuel-fired furnace and call for heat pump operation only.

In the preferred embodiment, the thermostat 100 may also be connected to other devices external to the thermostat associated with the climate control system, including a furnace flue pressure sensor, a carbon monoxide sensor and a smoke detector. The thermostat 100 may receive an input signal from a flue pressure sensor indicating the flue of a fuel-fired furnace is blocked, and respond by discontinuing further operation of the fuel-fired furnace to prevent combustion air in the flue from accumulating in the space. The thermostat 100 may similarly receive an input signal from a smoke detector indicating the presence of smoke in the space, and respond by discontinuing further operation of the fuel-fired furnace. The thermostat 100 may also receive an input signal from a carbon monoxide sensor indicating the presence of carbon monoxide, and respond by discontinuing further operation of the fuel-fired furnace and turning on the circulation blower fan. In a dual heating climate control system, the thermostat 100 may also call for operation of a heat pump if available after discontinuing operation of the fuel-fired furnace. It should be appreciated that in the preferred embodiment the thermostat may be configured to provide an appropriate response to any number of input signals from one or more apparatus in a climate control system.

The thermostat 100 may be configured to include an RS 485 or an RS 232 connection for receiving input signals from a plurality of external devices, and a monitoring means for analyzing and identifying the source of the input signal. The monitoring means enables the processor of the thermostat 100 to determine which system or apparatus the input signal corresponds to, for initiating an appropriate action in response to the information received through the RS 485 connection to the thermostat 100. Thus, the thermostat 100 implementing the present invention can respond to informational and error input signals, in various ways comprising the display of information associated with the input signal on a display of the thermostat, and the control of one or more heating apparatus in a climate control system.

It should be noted that the thermostat display may be used to display a description of the information received in the input signal and the time of the signal, for the purpose of trouble-shooting the climate control system. The information may also be communicated through other display means such as an LED that is flashed on and off to provide an optical signal that may be read by the user of the thermostat or by a flashing Light Emitting Diode (LED) used by a technician. Likewise, the inventive thermostat may be configured to be used with other apparatus not included in the preceding embodiment, such as an air conditioner of a climate control system.

Additional design considerations, readily apparent to one of ordinary skill in the art, such as the modification of the thermostat to provide error or fault information on the LCD display may also improve the user's ability to correct a problem in the climate control system. It should be apparent to those skilled in the art that various modifications such as the above may be made without departing from the spirit and scope of the invention. More particularly, the apparatus may be adapted to any apparatus for controlling a climate control system. Accordingly, it is not intended that the invention be limited by the particular form illustrated and described above, but by the appended claims.

What is claimed is:

1. A system for controlling the operation of a heat pump and auxiliary heating system, comprising:
    a controller for a heat pump having a compressor that is configured to transmit signals indicating that the compressor is inoperable;
    an auxiliary heating system having a furnace control; and
    a thermostat connected via one or more wires to the controller for the heat pump and connected via one or more wires to the furnace control, for controlling the operation of the heat pump and the auxiliary heating system, wherein the thermostat is configured to respond to input signals from the controller indicating that the compressor of the heat pump is inoperable by discontinuing operation of the heat pump and requesting operation of the auxiliary heating system to initiate auxiliary heating operation, regardless of the outside ambient temperature.

2. The system of claim 1 wherein the controller for the heat pump is capable of detecting a compressor discharge temperature or the compressor motor current above a predetermined threshold, the controller being configured to discontinue compressor operation when a predetermined threshold has been exceeded and to communicate a signal indicating that the compressor is not operating.

3. The system of claim 2 wherein the thermostat is further configured to discontinue sending signals to the controller requesting heating operation upon receiving a signal indicating that the compressor is inoperable or not operating properly, and to communicate signals to the auxiliary heating system.

4. The system of claim 1 wherein the auxiliary heating system is an electric heat source disposed within an indoor air circulator unit.

5. The system of claim 4 further comprising a controller for the indoor air circulator unit that selectively operates the auxiliary heating system upon receiving a signal from the thermostat requesting auxiliary heating operation.

6. A system for controlling the operation of a heat pump and auxiliary heating system, comprising:
    a controller for a heat pump having a compressor that is configured to transmit signals indicating that the compressor is inoperable;
    an auxiliary heating system having a furnace control; and
    a thermostat connected via one or more wires to the controller for the heat pump and connected via one or more wires to the furnace control, for controlling the operation of the heat pump and the auxiliary heating system, wherein the thermostat is configured to respond to input signals from the controller indicating that the compressor of the heat pump is inoperable by discontinuing operation of the heat pump and requesting operation of the auxiliary heating system to initiate auxiliary heating operation, regardless of the outside ambient temperature
    further comprising a two-wire network that the controller for the heat pump and thermostat are connected to, wherein the controller for the heat pump is configured to transmit signals at a fixed time period after the last transmission, which fixed time period is unique to the controller for the heat pump, and the thermostat is configured to transmit signals at a fixed time period after the last transmission that is unique to the thermostat.

* * * * *